US008867484B2

(12) United States Patent
Sebire

(10) Patent No.: US 8,867,484 B2
(45) Date of Patent: Oct. 21, 2014

(54) METHOD, APPARATUS AND COMPUTER PROGRAM PRODUCT FOR HANDOVER FAILURE RECOVERY

(75) Inventor: Benoist Sebire, Tokyo (JP)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 12/532,391

(22) PCT Filed: Mar. 13, 2008

(86) PCT No.: PCT/IB2008/050936
§ 371 (c)(1),
(2), (4) Date: Apr. 30, 2010

(87) PCT Pub. No.: WO2008/114183
PCT Pub. Date: Sep. 25, 2008

(65) Prior Publication Data
US 2010/0238799 A1 Sep. 23, 2010

Related U.S. Application Data

(60) Provisional application No. 60/896,078, filed on Mar. 21, 2007.

(51) Int. Cl.
*H04W 4/00* (2009.01)
(Continued)

(52) U.S. Cl.
CPC .............. *H04W 76/028* (2013.01); *H04W 4/24* (2013.01); *H04W 36/00* (2013.01); *H04W 28/04* (2013.01); *H04M 2215/7442* (2013.01); *H04M 15/8038* (2013.01); *H04W 8/26* (2013.01)
USPC .......................................... 370/331; 370/338

(58) Field of Classification Search
USPC ......... 370/241–252, 328, 329, 331, 332, 338, 370/341; 455/436–442
See application file for complete search history.

(56) References Cited

U.S. PATENT DOCUMENTS 7,593,417 B2 * 9/2009 Wang et al. .................... 370/428
2008/0070578 A1 * 3/2008 Flore et al. .................... 455/438

(Continued)

FOREIGN PATENT DOCUMENTS

EP 1903821 A2 3/2008
EP 2028890 A1 2/2009

(Continued)

OTHER PUBLICATIONS

International Search Report and Written Opinion of the International Searching Authority for PCT Application No. PCT/IB2008/050936, dated Aug. 12, 2008, 14 pages.

(Continued)

*Primary Examiner* — Kan Yuen
(74) *Attorney, Agent, or Firm* — Alston & Bird LLP

(57) ABSTRACT

An apparatus for facilitating handover failure recovery may include a handover management element configured to receive, at a target node, a handover request from a source node regarding the handover of communications with a mobile terminal. The handover request may include identity information indicative of the mobile terminal. The identity information may be the identity information used to identify the mobile terminal to the source node during establishment of the original connection between the source node and the mobile terminal. The handover management element may be further configured to receive a request for a connection from the mobile terminal subsequent to a radio link failure and prior to handover completion. Based on matching the identity information from the request for connection and the identity information received from the source node, the target node may establish communication with the mobile terminal based on access stratum configuration information used by the source node.

19 Claims, 7 Drawing Sheets

(51) Int. Cl.
*H04W 4/24* (2009.01)
*H04W 76/02* (2009.01)
*H04M 15/00* (2006.01)
H04W 36/00 (2009.01)
H04W 28/04 (2009.01)
H04W 8/26 (2009.01)

(56) References Cited

U.S. PATENT DOCUMENTS

| | | | |
|---|---|---|---|
| 2008/0089292 A1* | 4/2008 | Kitazoe et al. | 370/331 |
| 2008/0242292 A1 | 10/2008 | Koskela et al. | |
| 2009/0129335 A1* | 5/2009 | Lee et al. | 370/331 |
| 2010/0172326 A1* | 7/2010 | Kim et al. | 370/331 |
| 2011/0110335 A1* | 5/2011 | Weniger et al. | 370/331 |

FOREIGN PATENT DOCUMENTS

| | | |
|---|---|---|
| WO | 2008114183 A1 | 9/2008 |
| WO | 2008131401 A1 | 10/2008 |

OTHER PUBLICATIONS

3GPP TS 36.300 V1.0.0 (Mar. 2007) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Office Action from Korean Patent Application No. 10-2009-7022003, dated Feb. 18, 2011, 5 pages.

Qualcomm, "R2-062950, Forward Handover Considerations", 3GPP TSG-RAN2 Meeting #55, Oct. 13, 2006.

Samsung, "R2-060078, Handover Procedure for LTE Active UEs", 3GPP TSG-RAN2 Meeting #50, Jan. 13, 2006.

Office Action for Korean Application No. 2009-7022003 dated May 29, 2012.

Office Action for Canadian Application No. 2,677,072 dated Dec. 1, 2011.

Office Action from Chinese Patent Application No. 200880007558.5, dated May 29, 2012.

PP TS 36.300 V0.5.0; Evolved Universal Terrestrial Radio Access (E-UTRA) and Evolved Universal Terrestrial Radio Access Network (E-UTRAN); Overall description; Stage 2 (Release 8); Technical Specification Group Radio Access Network, 3$^{rd}$ Generation Partnership Project, pp. 34-46.

Chinese Office Action for Application No. 200880007558.5, dated Feb. 27, 2013.

Office Action for Chinese Application No. 20080007558.5 dated Sep. 23, 2013.

* cited by examiner

US 8,867,484 B2

METHOD, APPARATUS AND COMPUTER PROGRAM PRODUCT FOR HANDOVER FAILURE RECOVERY

RELATED APPLICATION

This application was originally filed as PCT Application No. PCT/IB2008/050936 on Mar. 13, 2008 and claims priority to U.S. Provisional Application No. 60/896,078 filed on Mar. 21, 2007, which is incorporated herein by reference in its entirety.

FIELD OF THE INVENTION

Embodiments of the present invention relate generally to wireless communication technology and, more particularly, relate to an apparatus, method and a computer program product for facilitating handover failure recovery.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. In this regard, it is currently common for an access point or base station providing network coverage for a particular area (or cell), to pass off communication with a particular mobile terminal to a neighboring base station when the user of the particular mobile terminal exits the coverage area of the base station. This process is often referred to as a handover.

Despite the evolution and improvement of telecommunication networks, the process of handover may not be entirely reliable in every situation. For example, a mobile terminal in communication with a particular base station may experience a radio link failure (RLF) due to poor channel conditions or other factors, making handover challenging. For example, if the RLF occurs before the mobile terminal receives a command to handover to another base station, communications may be lost with the particular base station. Thus, if the mobile terminal is able to establish communications with another terminal, a connection may need to be fully re-established. Accordingly, the handover may not be successfully accomplished. In such instances, a call may be dropped or discontinuities in communication may be perceived and user satisfaction with the service may be decreased.

Accordingly, despite continued efforts to improve telecommunications capabilities, there may be an existing need to improve handover procedures.

BRIEF SUMMARY OF THE INVENTION

A method, apparatus and computer program product are therefore provided that improves handover between base stations (which in E-UTRAN are referred to as node-Bs). For example, a mechanism is provided for improving a response to a handover failure. In order to accomplish this, for example, a handover recovery method may be employed, which may essentially provide information to a target node from a source node about the mobile terminal involved in the communication handover. In this regard, the source node may provide the target node with an identity of the mobile terminal involved in the handover so that if an RLF occurs before the mobile terminal receives a command to conduct a handover, and the mobile terminal later selects the target node, the target node may not need to fully re-establish communication context parameters with the mobile terminal. As such, a recovery from the failure to handover may be effectively performed. Accordingly, overall quality of service and user satisfaction may be maintained, while still enabling handover between nodes in an efficient manner.

In one exemplary embodiment, a method of facilitating handover failure recovery is provided. The method may include receiving, at a target node, a handover request from a source node regarding the handover of communications with a mobile terminal. The handover request may include identity information indicative of the mobile terminal. The identity information may be the identity information used to identify the mobile terminal to the source node during establishment of the original connection between the source node and the mobile terminal. The method may further include receiving a request for a connection from the mobile terminal subsequent to a radio link failure and prior to handover completion. The request for connection may include the identity information of the mobile terminal. The method may also include, based on matching the identity information from the request for connection and the identity information received from the source node, establishing communication with the mobile terminal based on access stratum configuration information used by the source node. The method may also include sending an indication to the mobile terminal as to whether the mobile terminal may continue to use prior context information.

In another exemplary embodiment, a computer program product for facilitating handover failure recovery is provided. The computer program product may include at least one computer-readable storage medium having computer-readable program code portions stored therein. The computer-readable program code portions may include a first executable portion, a second executable portion and a third executable portion. The first executable portion may be for receiving, at a target node, a handover request from a source node regarding the handover of communications with a mobile terminal. The handover request may include identity information indicative of the mobile terminal. The identity information may be the identity information used to identify the mobile terminal to the source node during establishment of the original connection between the source node and the mobile terminal. The second executable portion may be for receiving a request for a connection from the mobile terminal subsequent to a radio link failure and prior to handover completion. The request for connection may include the identity information of the mobile terminal. The third executable portion may be for, based on matching the identity information from the request for connection and the identity information received from the source node, establishing communication with the mobile terminal based on access stratum configuration information used by the source node. In an exemplary embodiment, the computer-readable program code portions may include a fourth executable portion for sending an indication to the mobile terminal as to whether the mobile terminal may continue to use prior context information.

In another exemplary embodiment, an apparatus for facilitating handover failure recovery is provided. The apparatus may include a handover management element configured to receive, at a target node, a handover request from a source node regarding the handover of communications with a mobile terminal. The handover request may include identity information indicative of the mobile terminal. The identity information may be the identity information used to identify the mobile terminal to the source node during establishment of the original connection between the source node and the mobile terminal. The handover management element may be further configured to receive a request for a connection from the mobile terminal subsequent to a radio link failure and prior to handover completion. Based on matching the identity information from the request for connection and the identity information received from the source node, the target node may establish communication with the mobile terminal based on access stratum configuration information used by the source node. In an exemplary embodiment, the handover management element may be further configured to send an indication to the mobile terminal as to whether the mobile terminal may continue to use prior context information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
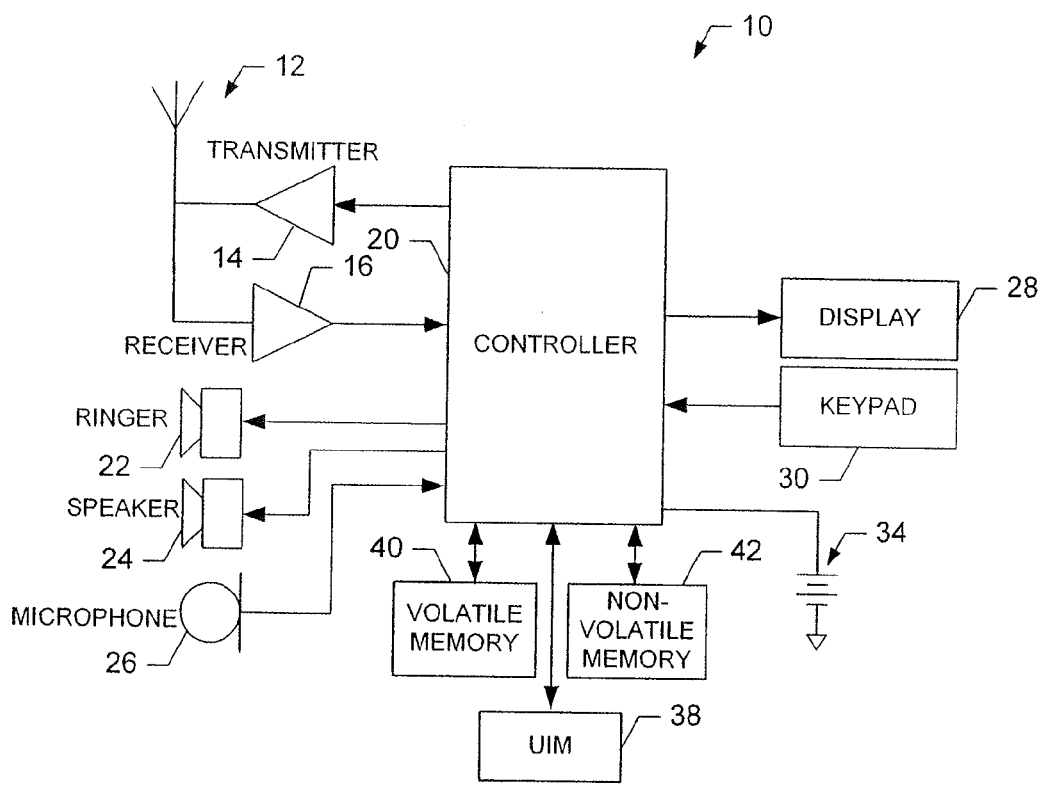
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, LTE or E-UTRAN, with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
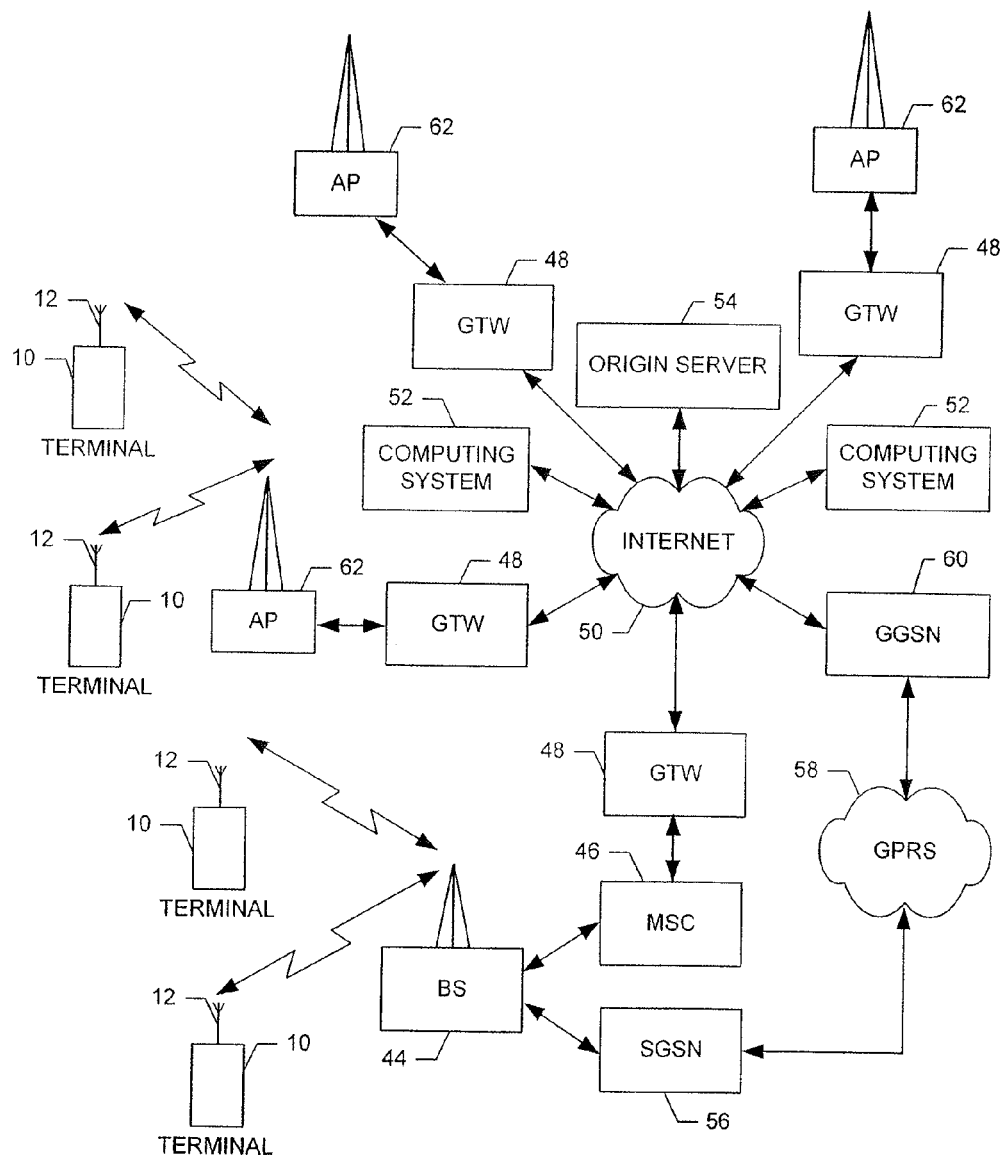
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as E-UTRAN or a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1 and a network device of the system of FIG. 2 in order to execute applications for establishing communication between the mobile terminal 10 and other mobile terminals, for example, via the system of FIG. 2. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a network device or other device accessible to the communication device.

Figure 3:
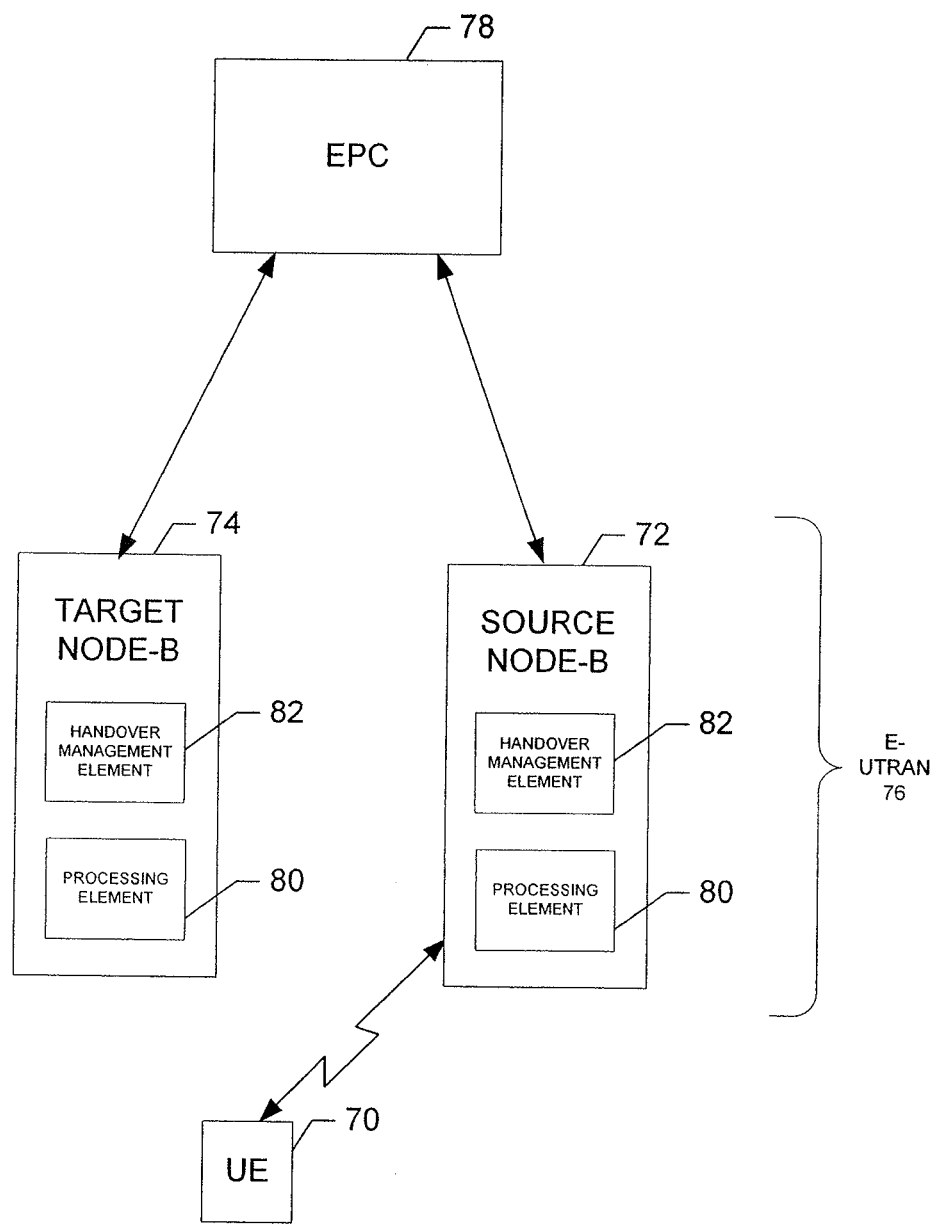
FIG. 3 is a schematic diagram showing system for facilitating handover failure recovery according to an exemplary embodiment of the present invention.

An exemplary embodiment of the invention will now be described with reference to FIG. 3, in which certain elements of a system for facilitating handover failure recovery are displayed. The system of FIG. 3 represents a specific embodiment of a network such as the general network displayed in FIG. 2, except that FIG. 3 represents a general block diagram of an E-UTRAN. As such, in connection with FIG. 3, user equipment (UE) 70 may be exemplary of one embodiment of the mobile terminal 10 of FIG. 1 and source node-B 72 and target node-B 74 may be exemplary of embodiments of either the BS 44 or AP 62 of FIG. 2. However, it should be noted that the system of FIG. 3, may also be employed in connection with a variety of other devices, both mobile and fixed, and therefore, the present invention should not be limited to application on devices such as the mobile terminal 10 of FIG. 1 or the network devices of FIG. 2.

Referring now to FIG. 3, a schematic block diagram showing a system for facilitating handover failure recovery according to an exemplary embodiment of the present invention is provided. The system includes an E-UTRAN 76 which may include, among other things, a plurality of node-Bs in communication with an evolved packet core (EPC) 78 which may include one or more mobility management entities (MMEs) and one or more system architecture evolution (SAE) gateways. The node-Bs (including source node-B 72 and target node-B 74) may be evolved node-Bs (e.g., eNBs) and may also be in communication with the UE 70 and other UEs.

The node-Bs may provide E-UTRA user plane and control plane (radio resource control (RRC)) protocol terminations for the UE 70. The node-Bs may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, SAE bearer control, ciphering and integrity protection of NAS signaling, and the like. The SAE gateway may host functions such as termination and switching of certain packets for paging and support of UE mobility. In an exemplary embodiment, the EPC 78 may provide connection to a network such as the Internet.

As shown in FIG. 3, the node-Bs may each include a processing element 80 configured to execute functions associated with each corresponding node-B. Such functions could be, for example, associated with stored instructions which when executed by the processing element 80 carry out the corresponding functions associated with the instructions. In an exemplary embodiment, each of the node-Bs may also include a handover management element 82 which may operate under the control of or otherwise be embodied as the processing element 80. A processing element such as those described above may be embodied in many ways. For example, the processing element 80 may be embodied as a processor, a coprocessor, a controller or various other processing means or devices including integrated circuits such as, for example, an ASIC (application specific integrated circuit).

The handover management element 82 may be any device or means embodied in either hardware, software, or a combination of hardware and software configured to determine whether to request a handover with another node-B based, for example, on measurement reports received from the UE 70. In this regard, for example, if measurement reports received at the source node-B 72 indicate the presence of a condition for which a handover is desirable (e.g., low signal strength), the source node-B 72 may send a handover request to the target node-B 74. In an exemplary embodiment of the present invention, the handover management element 82 may be configured to include with the handover request, identity information indicative of the identity of the UE 70. For example, the identity information indicative of the identity of the UE 70 may include an international mobile subscriber identity (IMSI), temporary mobile subscriber identity (TMSI), packet temporary mobile subscriber identity (PTMSI), international mobile equipment identity (IMEI), combinations of the above listed examples with each other or with other values or the like. For example, the identity information may include the C-RNTI of the UE 70 in the cell where a RLF occurs combined with a physical layer identity of the cell and the MAC based on keys associated with the cell. In one exemplary embodiment, the identity information must be the same identity information used by the UE 70 to request an RCC connection with the source node-B 72 when communication with the source node-B 72 was initially established. In other words, the identity information may include information that was communicated from the UE 70 to the source node-B 72 in, for example, an RRC_CONNECTION_REQUEST. Accordingly, for example, if a radio link failure were to occur, the source node-B 72 may provide the target node-B 74 with the identity of the UE 70, which may attempt to establish communication with the target node-B 74, to enable the target node-B 74 to at least temporarily communicate with the UE 70 with whatever access stratum (AS) configuration (e.g., RRC connection parameters) the UE 70 had established with the source node-B 72.

In another embodiment, the handover management element 82, when utilized in reference to a node-B operating as a target node-B (e.g., the target node-B 74), may also be configured to receive the identity information from, e.g., the source node-B 72, in order to enable connection with the UE 70 using the AS configuration established with the source node-B 72. In this regard, for example, the handover management element 82 may be configured for sending an indication to the UE 70 indicative of whether the UE 70 may continue to use the AS configuration (e.g., prior context information) that was used in communication with the source node-B 72.

In one embodiment, in order for the process above to work effectively, measures may be taken to ensure that the AS configuration information (e.g., RRC connection parameters, sequence numbers, etc.) is not deleted in the UE 70 in response to a radio link failure. In this regard, the processing element of the UE 70 (e.g., the controller 20) may be configured to store AS configuration information despite the occurrence of a radio link failure. In an exemplary embodiment, the processing element of the UE 70 may be configured to allow a timer to elapse prior to deletion of AS configuration information if a radio link failure is detected. A similar timer may also be utilized in the corresponding node-B with which the UE 70 was communicating prior to the radio link failure (e.g., the source node-B 72). Upon expiration of the timer, the AS configuration information may be deleted.

The UE 70 may also be configured to communicate identity information to, for example, the source node-B 72. Accordingly, the source node-B 72 may store AS configuration information associated with the identity information of the UE 70 such that, in case of a radio link failure, if the UE 70 attempts to re-establish communication with the source node-B 72 by, for example, issuing an RRC_CONNECTION_REQUEST message including the identity information indicative of the UE 70, the source node-B 72 may utilize the saved AS configuration information rather than establishing a new connection with the UE 70. Thus, if the source node-B 72 recognizes that stored AS configuration information associated with the UE 70 is available, the source node-B 72 may communicate a RCC_CONNECTION_RESPONSE to the UE 70 indicating that stored AS configuration information may be used for connection re-establishment.

Since the source node-B 72 receives identity information associated with the UE 70, the source node-B 72 (e.g., the handover management element 82 of the source node-B 72) may communicate the identity information to the target node-B 74 if a handover is desired as described above. Accordingly, the target node-B 74 may utilize the identity information to identify the UE 70 in case the UE 70 should happen to select the target node-B 74 to attempt to establish communication following the radio link failure. Thus, since in some situations a radio link failure may occur during a handover process, a necessity for the UE 70 to establish a new AS context upon connecting with the target node-B may be obviated in some situations.

Figure 4:
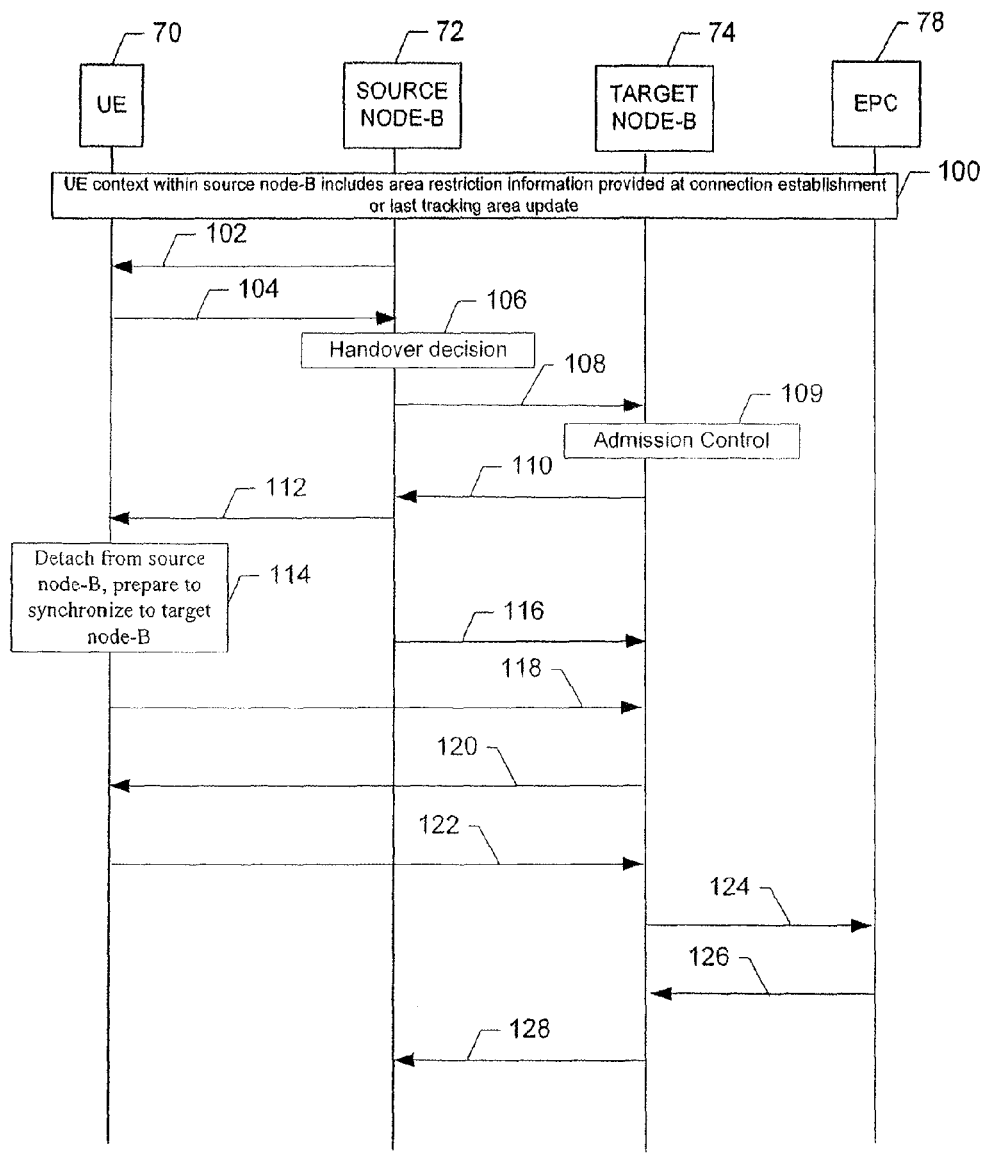
FIG. 4 is a control flow diagram of communication signals passed between entities of the exemplary embodiment of FIG. 3 during a handover process according to an exemplary embodiment of the present invention.

FIG. 4 is a control flow diagram of communication signals passed between entities of the exemplary embodiment of FIG. 3 during a handover process according to an exemplary embodiment of the present invention. As shown in FIG. 4, at operation 100 the UE may, during connection establishment with the source node-B, establish a context within source node-B which may include area restriction information and other AS configuration information. The source node-B may also receive the identity information from the UE during connection establishment. At operation 102, the source node-B may communicate configuration information to the UE regarding measurement procedures according to the area restriction information. At operation 104, the UE may be triggered to send a measurement report to the source node-B according to rules provided in the configuration information regarding measurement procedures. Based on the measurement report, the source node-B may make a handover decision at operation 106. If, as shown in FIG. 4, a decision is made to handover the connection to the target node-B, the source node-B may communicate a handover request to the target node-B at operation 108. The handover request may include information for preparing to handover the connection such as, for example, UE X2 signaling context reference at the source node-B, UE S1 EPC signaling context reference, target cell ID, RRC context, and/or SAE bearer context. The UE X2 signaling context reference may enable the target node-B to address the source node-B and the EPC. The SAE bearer context may include radio network layer, transport network layer addressing information, quality of service profiles of SAE bearers and AS configurations of the SAE bearers. The handover request according to exemplary embodiments of the present invention may also include the identity information indicative of the UE, which identity information was previously used to identify the UE to the source node-B during connection establishment between the UE and the source node-B.

At operation 109, admission control may be performed by the target node-B dependent upon the received SAE bearer QoS information in order to increase the likelihood of a successful handover. The target node-B may configure resources according to the SAE bearer QoS information and reserve a cell radio network temporary identifier (C-RNTI). The target node-B may communicate an acknowledgement of the handover request at operation 110. The handover request acknowledgement may include a transparent container to be sent to the UE as part of a handover command, which may include the new C-RNTI and other parameters such as access parameters.

At operation 112, the source node-B may communicate the handover command to the UE. The handover command may include the transparent container received from the target node-B. In response to the handover command, the UE may detach from the source node-B and prepare to synchronize to the target node-B at operation 114. At operation 116, the source node-B may begin delivering buffered and in transit packets to the target node-B, which may subsequently buffer the received packets. The UE may synchronize with the target node-B to acquire uplink allocation and timing information at operation 118. The target node-B may respond with the uplink allocation and timing information at operation 120. At operation 122, the UE may access the target node-B and issue a handover confirmation message to indicate that the UE has completed handover. The target node-B may inform the EPC of the completion of the handover at operation 124 and the EPC may acknowledge the completion of handover using a handover complete acknowledge message at operation 126. The target node-B may then send a release resource message 128 to the source node-B, to indicate that the source node-B may release resources associated with its communication with the UE. The source node-B may then delete the UE context information and AS configuration information.

Figure 5:
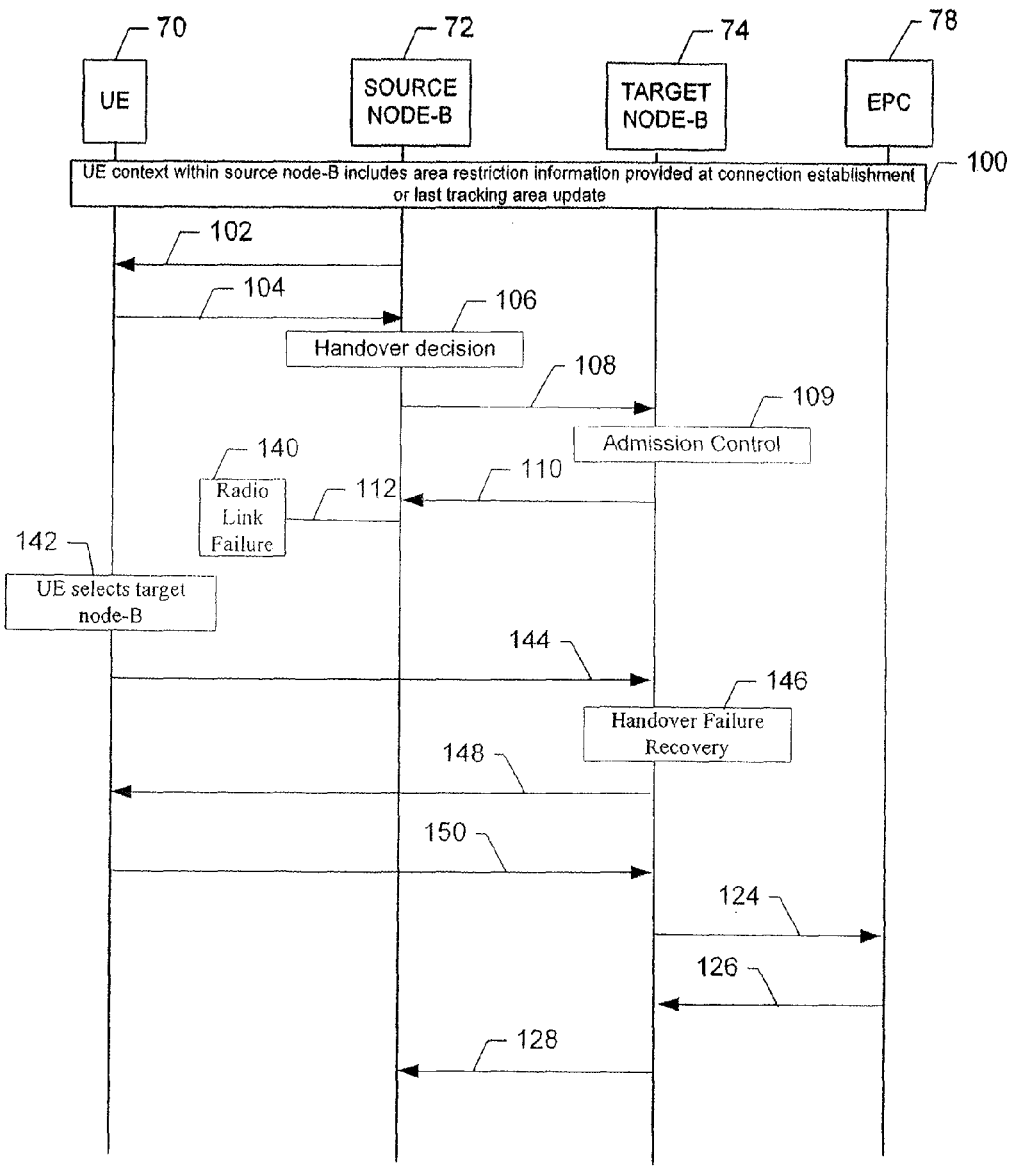
FIG. 5 is a control flow diagram of communication signals passed between entities of the exemplary embodiment of FIG. 3 during a handover process in which a radio link failure is experienced during the handover according to an exemplary embodiment of the present invention.

FIG. 5 is a control flow diagram of communication signals passed between entities of the exemplary embodiment of FIG. 3 during a handover process in which a radio link failure is experienced during the handover according to an exemplary embodiment of the present invention. As seen in FIG. 5, the process is similar to that explained with respect to FIG. 4 except that a radio link failure occurs before the UE receives the handover command as indicated at operation 140. At operation 142, the UE selects a new node-B (e.g., in this case the UE selects the target node-B). At operation 144, the UE issues an RCC_CONNECTION_REQUEST to the target node-B, which includes the identity information indicative of the UE. Having received the identity information identifying the UE at operation 108, the target node-B may determine that the received connection request is from the UE for which the target node-B had received a handover request. Accordingly, the target node-B may determine that a handover failure has occurred at operation 146 and perform a handover failure recovery by matching the identity information previously provided to the identity information provided in the RCC_CONNECTION_REQUEST. As such, the target node-B may communicate with the UE using the AS configuration information of the source node-B. The target node-B may communicate connection information to the UE at operation 148. In this regard, the target node-B may indicate to the UE whether the UE can reuse the AS configuration information (e.g., prior context information) used in communicating with source node-B. If the prior context information is to be used, the target node-B may communicate with the UE using the prior context information. Alternatively, if the prior context information is not to be used, the target node-B may request a change to the AS configuration information. The UE may issue a confirmation message at operation 150 and after such confirmation, operations 124 to 128 may be similar to those of FIG. 4.

Accordingly, as seen in FIG. 5, for example, the source node-B 72 may issue a handover request to the target node-B 74, but if a radio link failure occurs before the UE 70 receives the handover command and the UE 70 performs a cell selection (e.g., according to known methods) and selects the target node-B 74 (e.g., the node-B to which the handover was originally intended), the identity information provided to the target node-B 74 during the handover request may be used to enable a handover failure recovery by the target node-B.

Figure 6:
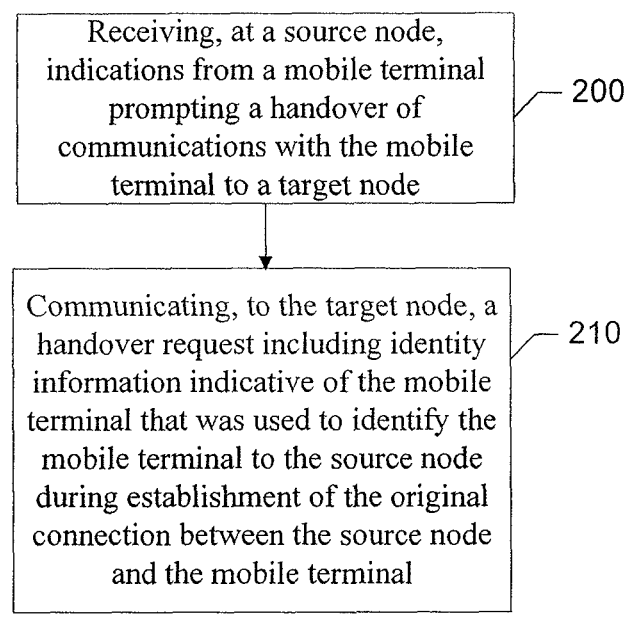
FIG. 6 is a flowchart according to an exemplary method of facilitating handover failure recovery according to an exemplary embodiment of the present invention.
Figure 7:
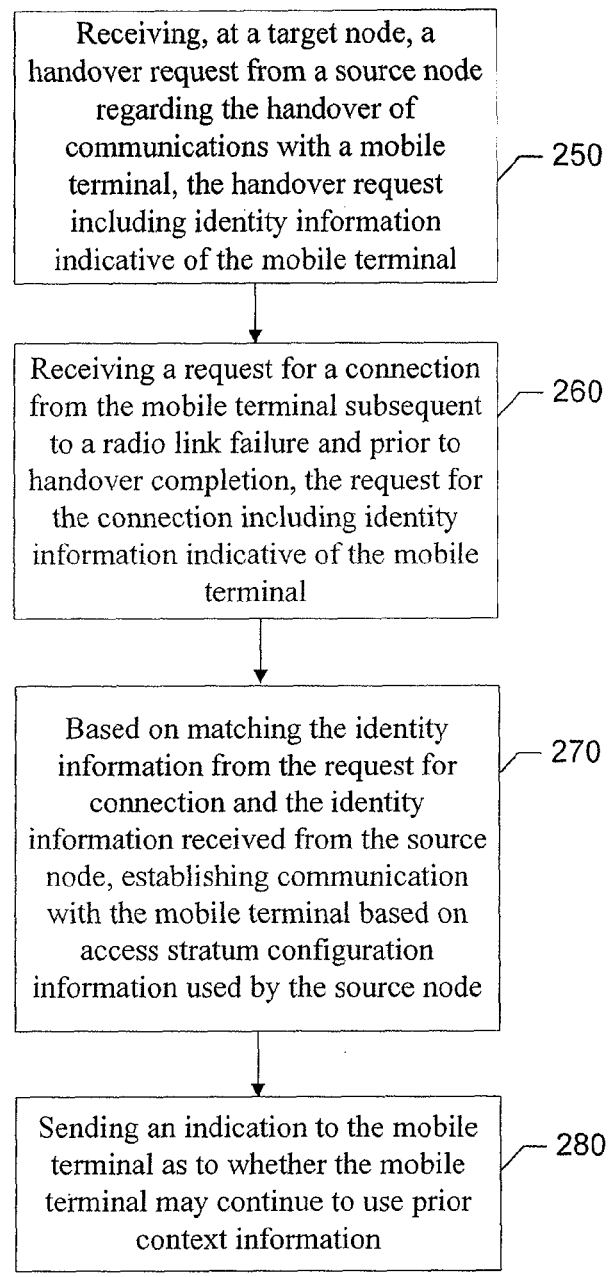
FIG. 7 is a flowchart according to another exemplary method of facilitating handover failure recovery according to an exemplary embodiment of the present invention.

FIGS. 6 and 7 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for facilitating a handover recovery as illustrated in FIG. 6 includes receiving, at a source node, indications from a mobile terminal prompting a handover of communications with the mobile terminal to a target node at operation 200. At operation 210, a handover request is communicated to the target node. The handover request may include identity information indicative of the mobile terminal. The identity information may be the identity information used to identify the mobile terminal to the source node during establishment of the original connection between the source node and the mobile terminal.

FIG. 7 illustrates another embodiment of a method for facilitating a handover recovery. The method may include, for example, receiving, at a target node, a handover request from a source node regarding the handover of communications with a mobile terminal at operation 250. The handover request may include identity information indicative of the mobile terminal. The identity information may be the identity information used to identify the mobile terminal to the source node during establishment of the original connection between the source node and the mobile terminal. As indicated by operation 260, the method may include receiving a request for a connection from the mobile terminal subsequent to a radio link failure and prior to handover completion. The request for connection may include the identity information of the mobile terminal. At operation 270, based on matching the identity information from the request for connection and the identity information received from the source node, the target node may establish communication with the mobile terminal based on access stratum configuration information used by the source node. In an exemplary embodiment, the target node may also establish communication with the mobile terminal based on non-access stratum configuration information since some information regarding the UE may come from the EPC and be available for reuse. The method may include an additional operation 280 including sending an indication to the mobile terminal as to whether the mobile terminal may continue to use prior context information.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a target node of a handover operation, a request for connection from a mobile terminal subsequent to a radio link failure;
   determining, at the target node, whether stored context information is associated with stored mobile terminal identity information that matches mobile terminal identity information in the request for connection, the mobile terminal identity information configured to uniquely identify the mobile terminal;
   indicating to the mobile terminal, by the target node, that a connection is establishable based on the stored context information in response to the mobile terminal identity information in the request for connection matching the stored mobile terminal identity information; and
   receiving, at the target node, a handover request from a source node of the handover operation, wherein the handover request includes identity information indicative of the mobile terminal, wherein the request for connection is received prior to completion of a handover.

2. The method according to claim 1, further comprising establishing communication with the mobile terminal based on the stored context information in which the stored mobile terminal identity information is the same mobile terminal identity information used to identify the mobile terminal to the source node during establishment of an original connection between the source node and the mobile terminal.

3. The method according to claim 2, wherein establishing communication with the mobile terminal based on the stored context information comprises establishing communication with the mobile terminal based on access stratum configuration information used by the source node in communications with the mobile terminal.

4. The method according to claim 2, further comprising, in response to completion of a handover to the target node, communicating a release message to the source node enabling the source node to release resources associated with communication with the mobile terminal.

5. The method according to claim 1, wherein receiving the handover request further comprises receiving context information associated with communications between the mobile terminal and the source node with the handover request.

6. The method according to claim 5, further comprising storing the received context information at the target node for a predetermined amount of time.

7. A computer program product comprising at least one non-transitory computer-readable storage medium having computer-readable program code portions stored therein, the computer-readable program code portions comprising:
   a first executable portion for receiving, at a target node of a handover operation, a request for connection from a mobile terminal subsequent to a radio link failure;
   a second executable portion for determining, at the target node, whether stored context information is associated with stored mobile terminal identity information that matches mobile terminal identity information in the request for connection, the mobile terminal identity information configured to uniquely identify the mobile terminal;
   a third executable portion for indicating to the mobile terminal, by the target node, that a connection is establishable based on the stored context information in response to the mobile terminal identity information in the request for connection matching the stored mobile terminal identity information; and a fourth executable portions for receiving, at the target node, a handover request from a source node of the handover operation, wherein the handover request includes identity information indicative of the mobile terminal, wherein the request for connection is received prior to completion of a handover.

8. The computer program product of claim 7, wherein the fourth executable portion includes instructions for receiving context information associated with communications between the mobile terminal and the source node with the handover request.

9. The computer program product of claim 8, further comprising a fifth executable portion for storing the received context information at the target node for a predetermined amount of time.

10. An apparatus comprising at least one processor; and at least one memory including computer program code, the at least one memory and the computer program code configured to, with the at least one processor, cause the apparatus to perform at least the following:

receive a request for connection from a mobile terminal subsequent to a radio link failure;

determine whether stored context information is associated with stored mobile terminal identity information that matches mobile terminal identity information in the request for connection, the mobile terminal identity information configured to uniquely identify the mobile terminal;

indicate to the mobile terminal that a connection is establishable based on the stored context information in response to the mobile terminal identity information in the request for connection matching the stored mobile terminal identity information; and receive a handover request from a source node of a handover operation, wherein the handover request includes identity information indicative of the mobile terminal, wherein the request for connection is received prior to completion of a handover.

11. The apparatus according to claim 10, wherein the computer code is further configured to, with the processor, cause the apparatus to: establish communication with the mobile terminal based on the stored context information in which the stored mobile terminal identity information is the same mobile terminal identity information used to identify the mobile terminal to the source node during establishment of an original connection between the source node and the mobile terminal.

12. The apparatus according to claim 11, wherein the computer code is configured to, with the processor, cause the apparatus to: establish communication with the mobile terminal based on the stored context information by establishing communication with the mobile terminal based on access stratum configuration information used by the source node in communications with the mobile terminal.

13. The apparatus according to claim 10, wherein the computer code is configured to, with the processor, cause the apparatus to: receive the handover request by receiving context information associated with communications between the mobile terminal and the source node with the handover request.

14. The apparatus according to claim 13, wherein the computer code is further configured to, with the processor, cause the apparatus to: store the received context information for a predetermined amount of time.

15. The apparatus according to claim 10, wherein the computer code is further configured to, with the processor, cause the apparatus to: in response to completion of the handover operation, communicate a release message to the source node enabling the source node to release resources associated with communication with the mobile terminal.

16. The apparatus according to claim 10, wherein the apparatus comprises at least part of a target node of a handover operation.

17. A method comprising:

providing, to a target node of a handover operation, a request for connection from a mobile terminal subsequent to a radio link failure, the request comprising mobile terminal identity information, the mobile terminal identity information configured to uniquely identify the mobile terminal; and receiving, at the mobile terminal, an indication from the target node, that a connection is establishable based on a determination, made by the target node, that the stored context information is associated with stored mobile terminal identity information that matches mobile terminal identity information received in the request for connection; and establishing communication with the target node based on the stored context information in which the stored mobile terminal identity information is the same mobile terminal identity information used to identify the mobile terminal to a source node during establishment of an original connection between the source node and the mobile terminal.

18. A computer program product comprising at least one non-transitory computer-readable storage medium having computer-readable program code portions stored therein, the computer-readable program code portions comprising:

a first executable portion for providing, to a target node of a handover operation, a request for connection from a mobile terminal subsequent to a radio link failure, the request comprising mobile terminal identity information, the mobile terminal identity information configured to uniquely identify the mobile terminal;

a second executable portion for receiving, at the mobile terminal, an indication from the target node, that a connection is establishable based on a determination, made by the target node, that the stored context information is associated with stored mobile terminal identity information that matches mobile terminal identity information received in the request for connection; and a fourth executable portion for establishing communication with the target node based on the stored context information in which the stored mobile terminal identity information is the same mobile terminal identity information used to identify the mobile terminal to a source node during establishment of an original connection between the source node and the mobile terminal.

19. An apparatus comprising at least one processor; and at least one memory including computer program code, the at least one memory and the computer program code configured to, with the at least one processor, cause the apparatus to perform at least the following:

provide to a target node of a handover operation, a request for connection from the apparatus subsequent to a radio link failure, the request comprising mobile terminal identity information, the mobile terminal identity information configured to uniquely identify the apparatus; and receive, at the apparatus, an indication from the target node, that a connection is establishable based on a determination, made by the target node, that the stored context information is associated with stored mobile terminal identity information that matches mobile terminal identity information received in the request for connection; and
establish communication with the target node based on the stored context information in which the stored mobile terminal identity information is the same mobile terminal identity information used to identify the apparatus to a source node during establishment of an original connection between the source node and the apparatus.

* * * * *